(12) United States Patent
Okabayashi et al.

(10) Patent No.: US 9,678,706 B2
(45) Date of Patent: Jun. 13, 2017

(54) AUDIO SIGNAL PROCESSING DEVICE, PARAMETER RECALL METHOD AND STORAGE MEDIUM

(71) Applicant: Yamaha Corporation, Hamamatsu-shi, Shizuoka-ken (JP)

(72) Inventors: Masaaki Okabayashi, Hamamatsu (JP); Masaru Aiso, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 34 days.

(21) Appl. No.: 14/639,953

(22) Filed: Mar. 5, 2015

(65) Prior Publication Data
US 2015/0254055 A1 Sep. 10, 2015

(30) Foreign Application Priority Data

Mar. 7, 2014 (JP) ................................ 2014-044814

(51) Int. Cl.
*G06F 17/00* (2006.01)
*G06F 3/16* (2006.01)
*H04H 60/04* (2008.01)
*G05B 15/02* (2006.01)

(52) U.S. Cl.
CPC .............. *G06F 3/165* (2013.01); *G05B 15/02* (2013.01); *H04H 60/04* (2013.01)

(58) Field of Classification Search
CPC ................................ H04H 60/04; G06F 3/165
See application file for complete search history.

(56) References Cited

U.S. PATENT DOCUMENTS

| | | | |
|---|---|---|---|
| 2005/0019021 A1 | 1/2005 | Takahashi | |
| 2007/0058823 A1* | 3/2007 | Terada | H04H 60/04 381/119 |
| 2008/0219478 A1* | 9/2008 | Aoki | H04H 60/04 381/119 |
| 2009/0064850 A1 | 3/2009 | Lengeling | |

FOREIGN PATENT DOCUMENTS

| | | |
|---|---|---|
| EP | 1 580 910 A2 | 9/2005 |
| EP | 1 703 652 A2 | 9/2006 |
| JP | 3933104 B2 | 6/2007 |

OTHER PUBLICATIONS

Extended European Search Report mailed Jul. 15, 2015, for EP Application No. 15158072.7, seven pages.

* cited by examiner

Primary Examiner — Thomas Maung
(74) Attorney, Agent, or Firm — Morrison & Foerster LLP

(57) ABSTRACT

When recalling a preliminary stored scene including parameter values regarding a plurality of input/output ports respectively receiving or outputting an audio signal with respect to outside, a plurality of transmission/reception ports respectively transmitting or receiving an audio signal with respect to another equipment via a network, a signal processing channel processing an audio signal, and a patch transmitting an audio signal among the plurality of input/output ports, the plurality of transmission/reception ports and the signal processing channel, a setting to leave parameter values defining connection between the input/output ports and the transmission/reception ports by the patch before the recall as they are can be performed by a particular group safe setting button.

14 Claims, 5 Drawing Sheets

AUDIO SIGNAL PROCESSING DEVICE, PARAMETER RECALL METHOD AND STORAGE MEDIUM

TECHNICAL FIELD

The present invention relates to an audio signal processing device, a parameter recall method and a storage medium.

BACKGROUND ART

Conventionally, operation of plural audio signal processing devices such as digital mixers has been performed by connecting the devices using a network capable of transmitting plural audio signals and control signals in parallel.

In such audio signal processing devices, it is possible to connect an input port to handle an audio signal inputted from an input terminal, to a transmission port to handle transmission of the audio signal to the network, with a patch, and thereby immediately transmit the audio signal inputted from the input terminal to the network and subject the audio signal to signal processing with another audio signal processing device.

Further, it is possible to connect a reception port to handle reception of an audio signal from the network, to an output port to handle the audio signal outputted to an output terminal, with a patch, and thereby immediately output the audio signal received from the network, from the output terminal.

These connections are made when a part of a first audio signal processing device is used as a signal input/output device to provide a terminal for signal input from a network or signal output to the network. For example, the connections enable signal processing in which an audio signal inputted from an input terminal of the first audio signal processing device is subjected to signal processing with a second audio signal processing device, and then the processed signal is outputted from an output terminal of the first audio signal processing device.

Further, in addition to the above technique, there is an also known technique to store (save) the settings of signal processing at respective time points in a digital mixer (operation parameters to be described later) at once, as one scene, in a scene memory, then recall (call) a desired scene from the stored plural scenes in accordance with necessity, and reflect the scene in signal processing. Further, a recall safe technique to, upon this recall, designate a parameter of a part of the scene, and prevent recall with respect to the parameter, i.e., to maintain a parameter value before the recall, is known.

The recall safe is described in e.g. PTL1.

CITATION LIST

Patent Literature

{PTL1} JP 3933104 B2

SUMMARY OF INVENTION

Technical Problem

When a part of the first audio signal processing device is used as a signal input/output device as described above, regarding the part to function as the signal input/output device, change of a parameter value of the part influences signal processing in the second audio signal processing device which inputs the audio signal from the part and outputs the audio signal to the part. More particularly, in the second audio signal processing device, readjustment of related signal processing parameter is required.

On the other hand, when scene recall is performed in the first audio signal processing device, the parameter value related to the above "part" is also overwritten with the value in the recalled scene along with the parameter value of another part unless any particular operation is performed. When the audio signal of the above "part" is not processed with the first audio signal processing device itself, it is desirable that the parameter value is not overwritten upon scene recall, but kept unchanged.

In such case, it is conceivable to adopt the recall safe technique as described in PTL1 in the first audio signal processing device, and set the recall safe such that the recall is not performed on the above "part". However, the above-described connection with a patch is not fixed but changed by a user at any time, and in correspondence with the change, the portion (port number or the like) as the "part" to function as the signal input/output device is changed. The problem is that it is very troublesome for the user to accurately grasp the point of the "part" every time the patch is changed and perform safe setting on the portion.

The present invention has been made in view of this background, and has an object to, even when a previously stored value is recalled as a parameter value to be used in an audio signal processing device, regarding a portion directly connecting input or output via a terminal with transmission or reception with respect to a network, maintain a parameter value before recall with a simple operation.

Solution to Problem

To attain the above object, an audio signal processing device of the invention is an audio signal processing device including: a plurality of input ports respectively configured to receive an audio signal from outside and process the audio signal based on a port parameter value; a plurality of transmission ports respectively configured to transmit an audio signal via a network; a signal processing channel configured to process an audio signal; a patch configured to supply an audio signal from the plurality of input ports to the plurality of transmission ports and the signal processing channel in accordance with a plurality of connections indicated by a patch parameter value; a first storage configured to store at least the port parameter values of the respective input ports and the patch parameter value of the patch; a second storage configured to store a set of parameter values to be stored in the first storage; a recall portion configured to write parameter values included in one set of the parameter values stored in the second storage over corresponding parameter values in the first storage in accordance with a recall instruction; and a prohibition portion configured to prohibit, with respect to a first input port regarding which the connection indicated by the patch parameter in the first storage after the overwriting by the recall portion satisfies a predetermined condition, overwriting of the port parameter value of the first input port by the recall portion.

In the above audio signal processing device, it is preferable that the predetermined condition is that the first input port is not connected to the signal processing channels but is connected to any of the transmission ports.

Alternatively, it is also preferable that the predetermined condition is that the first input port is not connected to the signal processing channels.

Another audio signal processing device of the invention is such that, in the case where a patch connects a plurality of input/output ports respectively configured to receive an audio signal from outside or output an audio signal to outside, a plurality of transmission/reception ports respectively configured to transmit an audio signal to another equipment via a network or receive an audio signal from another equipment via the network, and a signal processing channel configured to process an audio signal, the prohibition portion is configured to prohibit, with respect to a first parameter whose value before the overwriting by the recall portion indicates a connection between the input/output port and the transmission/reception port among the one set of parameters stored in the first storage, the overwriting by the recall portion.

Still another audio signal processing device of the invention is such that, in the case where a patch connects a plurality of output ports respectively configured to output an audio signal to outside, a plurality of reception ports respectively configured to receive an audio signal via a network based on a port parameter value, and a signal processing channel configured to process an audio signal, the prohibition portion is configured to prohibit, with respect to a first reception port regarding which the patch parameter value in the first storage after the overwriting by the recall portion does not indicate a connection to the signal processing channels but a connection to any of the output ports, the overwriting of the port parameter value of the first reception port by the recall portion.

Still another audio signal processing device of the invention is such that, in the case where a patch connects a plurality of output ports respectively configured to process an audio signal and output the audio signal to outside based on a port parameter value, a plurality of reception ports respectively configured to receive an audio signal via a network, and a signal processing channel configured to process an audio signal, the prohibition portion is configured to prohibit, with respect to a first output port regarding which the patch parameter value in the first storage after the overwriting by the recall portion indicates a connection to the reception port, the overwriting of the port parameter value of the first output port by the recall portion.

The above configuration can be realized or embodied as an arbitrary style such as a method, a system, a computer program, a storage medium storing a computer program, other than the above devices.

Advantageous Effects of Invention

According to the configurations of the present invention as described above, even when a previously stored value is recalled as a parameter value to be used in an audio signal processing device, regarding a portion directly connecting input/output via a terminal with transmission/reception with respect to a network, it is possible to maintain a parameter value before recall with a simple operation.

DESCRIPTION OF EMBODIMENTS

Hereinbelow, an embodiment to implement the present invention will be specifically described based on the drawings.

Figure 1:
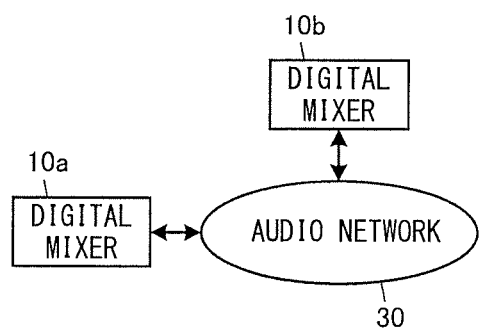
FIG. 1 is a diagram illustrating a configuration of an audio signal processing system including an embodiment of an audio signal processing device according to the present invention.

First, FIG. 1 shows an example of a configuration of an audio signal processing system including a digital mixer as an embodiment of the audio signal processing device according to the present invention.

In the audio signal processing system shown in FIG. 1, two digital mixers 10*a* and 10*b* are connected with an audio network 30.

In these devices, although the details will be described later, the digital mixers 10*a* and 10*b* are audio signal processing devices respectively having plural signal processing channels to perform various signal processings such as level adjustment and frequency property adjustment on one supplied audio signal and output the processed audio signal, and plural mixing buses to perform mixing on the audio signal supplied from the signal processing channel. Further, the devices perform audio signal input or audio signal output with respect to an external equipment via a terminal (via an input port or an output port), and perform audio signal transmission or audio signal reception with respect to the audio network 30 (via a transmission port or a reception port) by one audio signal per one port, using plural ports. Further, the signal transmission among the above terminal, the signal processing channel and the audio network 30 is also performed via a transmission path according to the user's setting.

In this example, the digital mixers 10*a* and 10*b* are not necessarily of the same model, however, have equivalent functions as the above-described audio signal processing devices. Accordingly, in the following description, when it is not necessary to distinguish individual bodies, the reference numeral without alphabet, "digital mixer 10" is used. Other reference numerals denoting the constituent elements of the digital mixer 10 are used in the same manner.

The audio network 30 is a network capable of transmitting plural audio signals (digital waveform data) and control signals in parallel. When this transmission is possible, a network in conformity with arbitrary standard is adoptable regardless of cable or wireless communication. For example, it is conceivable that networks such as EtherSound (trademark), CobraNet (trademark), Dante (trademark), AVB (trademark), and TwinLANe (trademark) are used.

Figure 2:
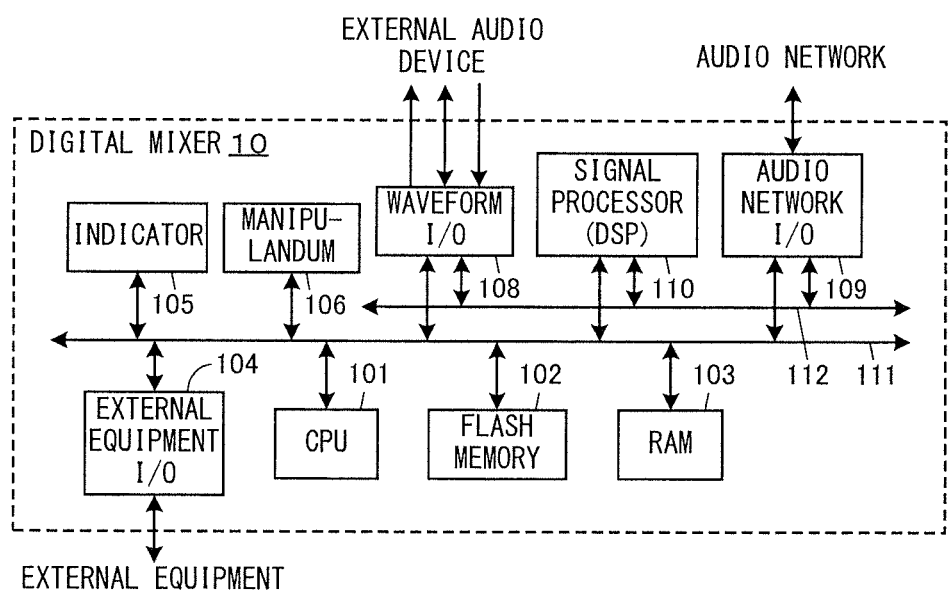
FIG. 2 is a diagram illustrating a hardware configuration of the digital mixer shown in FIG. 1.

Next, FIG. 2 illustrates a hardware configuration of the digital mixer 10 shown in FIG. 1.

As shown in FIG. 2, the digital mixer 10 has a CPU 101, a flash memory 102, a RAM 103, an external equipment interface (I/O) 104, an indicator 105, a manipulandum 106, a waveform I/O 108, an audio network I/O 109, and a digital signal processor (DSP) 110. These elements are connected with one another via a system bus 111. Further, the waveform I/O 108, the audio network I/O 109 and the signal processor (DSP) 110 are connected one another also via an audio bus 112.

The CPU 101 is a processing circuit to perform integrated control on the operation of the digital mixer 10. The CPU 101 realizes various functions such as data and signal input/output in the external equipment I/O 104, the waveform I/O 108 and the audio network I/O 109, display control in the indicator 105, detection of operation in the manipulandum 106, and control of parameter-value setting and parameter-value change according to the operation of the manipulandum 106, by executing a predetermined program stored in the flash memory 102.

The flash memory 102 is a rewritable nonvolatile storage portion to store the control program to be executed by the CPU 101 and data which is not necessarily rewritten frequently.

The RAM 103 is a storage portion used for storing data to be temporarily stored, or used as a work memory for the CPU 101.

The external equipment I/O 104 is an interface to connect various external equipments and perform data communication. For example, an interface for connection to an external display, a mouse, a keyboard for character input, an operation panel and the like is prepared. It may be arranged such that a PC is connected to the external equipment I/O 104 and the digital mixer 10 is remote-controlled from the PC.

The indicator 105 is a display portion to display various information in accordance with control by the CPU 101. The indicator 105 may be configured with e.g. a liquid crystal panel (LCD) and a light emitting diode (LED).

The manipulandum 106 includes various types of controls to accept operations to the digital mixer 10. The manipulandum 106 may be configured with moving faders, keys, buttons, rotary encoders, sliders and the like. A virtual control, displayed on a screen of the indicator 105, may be used.

The waveform I/O 108 has plural input terminals to accept input of an audio signal from an external device and/or plural output terminals to output an analog audio signal to the external device. In correspondence with the plural respective analog input terminals, the waveform I/O 108 has plural input ports to handle an audio signal supplied from devices connected to the terminals, and further, in correspondence with the plural respective output terminals, has plural output ports to handle the audio signal to be outputted to the devices connected to the terminals.

The respective input ports A/D (analog/digital) convert one analog audio signal inputted from one corresponding input terminal into a digital audio signal. The digital audio signal is supplied via the audio bus 112 to a supply destination connected with the input port by a patch to be described later. The respective input ports have functions to perform signal processings such as gain control of the analog audio signal with a head amplifier, phantom power supply to the input terminal, and low-frequency noise elimination from the digital audio signal with an HPF (high-pass filter), during this process.

Further, the respective output ports receive one digital audio signal from one supply source connected with the output port by a patch to be described later via the audio bus 112, D/A (digital/analog) convert the digital audio signal into an analog audio signal, and output the analog audio signal to the corresponding one output terminal. The respective output ports have functions to perform signal processings such as delaying and/or gain control on the digital audio signal during this process.

The audio network I/O 109 is an interface to transmit a digital audio signal and a control signal to another device and receive them from another device via the audio network 30 through plural transmission channels. Further, the audio network I/O 109 has plural transmission ports to respectively perform transmission of one audio signal via the audio network 30 and plural reception ports to respectively perform reception of one audio signal via the audio network 30.

The transmission port receives one audio signal from one supply source connected with the transmission port by a patch to be described later via the audio bus 112, and transmits this signal into a designated transmission band of the audio network 30.

The reception port obtains the audio signal from the designated transmission band of the audio network 30. The audio signal is supplied to a supply destination connected with the reception port by a patch to be described later via the audio bus 112.

The transmission of the audio signal between these ports will be described in detail later.

The DSP 110 which includes a signal processing circuit is a signal processing portion. The DSP 110 has plural signal processing channels (hereinbelow, referred to as simply "channel") to respectively perform equalizing, level adjustment and the like, plural buses to respectively perform mixing, and the like, which perform various signal processing in accordance with various parameter values set as currently valid operation parameters. The DSP 110 processes an audio signal inputted from the waveform I/O 108 or the audio network I/O 109 with the above channels, buses, and the like, and outputs the processed audio signal to the waveform I/O 108 or the audio network I/O 109. The operation parameter values used in these processings are stored in the RAM 103 or an operation parameter memory as a first storage portion provided in the DSP 110 itself. The user checks or changes the data values using the indicator 105 and the manipulandum 106.

Figure 3:
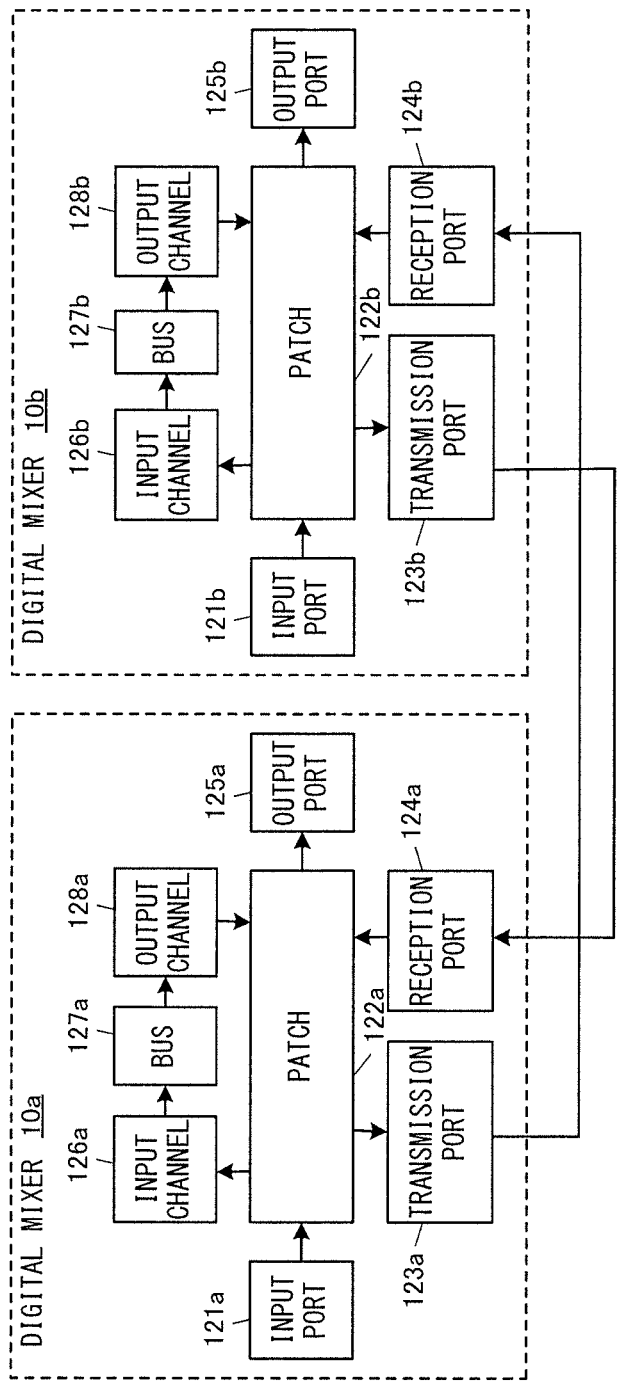
FIG. 3 is a diagram illustrating signal transmission paths in the digital mixer and the input/output device shown in FIG. 1 and between the devices.

Next, signal transmission paths inside and between the above-described digital mixers 10a and 10b will be described in more detail. FIG. 3 is a diagram illustrating the signal transmission paths.

In FIG. 3, the plural input ports 121a and the plural output ports 125a in the digital mixer 10a are plural input/output ports of the waveform I/O 108. The plural transmission ports 123a and the plural reception ports 124a are plural transmission/reception ports of the audio network I/O 109.

The respective plural input channels 126a, the plural buses 127a and the plural output channels 128a are signal processings respectively realized by the DSP 110. The respective input channels 126a perform various signal processings such as equalizing and level adjustment with respect to each bus on the audio signal supplied from the patch 122a, and output the processed signal to the plural buses 127a. The buses 127a perform mixing on the audio signals inputted from the plural input channels 126a with respect to each bus, and output the mixed signal to one of the plural output channels 128a corresponding to the bus. The respective output channels 128a perform various signal processings such as equalizing and reverberation adding on the audio signal after the mixing by the bus 127a, and output the signal to the patch 122a.

The patch 122a has a function of, in accordance with connection between a "supply source" which supplies an audio signal to the patch and a "supply destination" which is supplied with the audio signal from the patch, set by the user, transmitting the audio signal from the supply source to the supply destination.

In this example, the plural input ports 121a, the plural reception ports 124a, and the plural output channel 128a are the supply sources, and the plural output ports 125a, the plural transmission ports 123a, and the plural input channels 126a are the supply destinations. In the settings of the patch 122a, the user connects up to one desired supply source, i.e., an input port, a reception port or an output channel, to the respective plural transmission ports 123a, the respective plural output ports 125a, and the respective plural input channels 126a.

A supply destination not connected with any supply source is supplied with a silent audio signal from a certain supply source in the patch. Further, when some supply source is not connected with any supply destination, the audio signal supplied from the supply source is not subjected to the subsequent processing, and vanishes in the patch.

In any way, the patch 122a supplies the respective plural supply destinations with an audio signal from a supply source connected to the supply destinations via the audio bus 112.

In the digital mixer 10b, signal transmission in the device is similar to that in the digital mixer 10a.

Further, the respective plural transmission ports 123a and 123b in the respective devices transmit one audio signal supplied from a signal supply source to one transmission band of the audio network 30. It is conceivable that a transmission band to be used is designated for each of the transmission ports by a user, or automatically designated by the device upon start of transmission in the transmission port.

Further, the respective plural reception ports 124a and 124b in the respective devices read and receive an audio signal from one transmission band of the audio network 30. It is conceivable that a transmission band from which the audio signal is to be read is designated for each of the reception ports by the user, or automatically designated by the device based on information from the respective transmission ports as transmission sources to the respective transmission bands.

As described above, it is possible to transmit an audio signal from an arbitrary transmission port of an arbitrary device to an arbitrary reception port of an arbitrary device in the audio signal processing system shown in FIG. 1 by appropriately setting a transmission band used for signal transmission from the respective transmission ports and a transmission band for signal reading by the respective reception ports. Note that plural reception ports can receive an audio signal transmitted from one transmission port without any problem.

Figure 4:
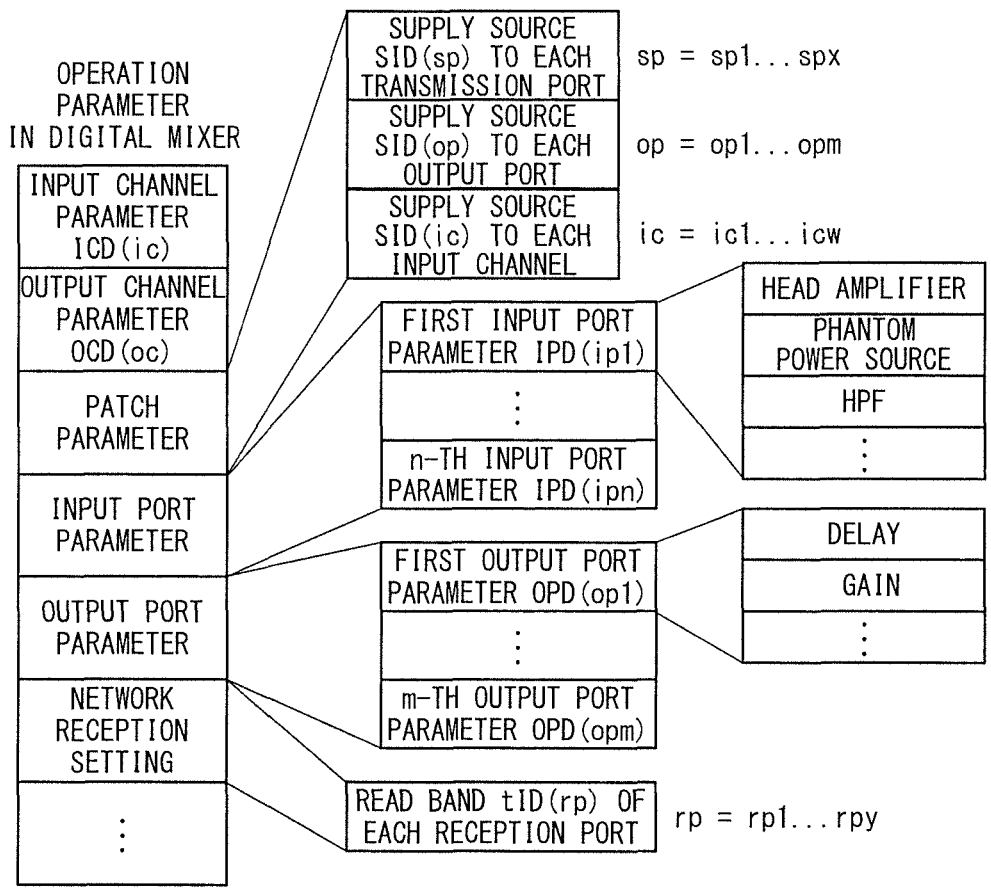
FIG. 4 is a diagram illustrating a configuration of an operation parameter defining signal processing performed in the digital mixer, stored in the digital mixer.

Next, FIG. 4 illustrates a configuration of the operation parameter, stored in the operation parameter memory, to control signal processing executed in the digital mixer 10. Note that the array of the parameters in this figure is an example. It is not necessary to array the parameters in this order.

As shown in FIG. 4, the operation parameter includes respectively plural input channel parameters, output channel parameters, patch parameters, input port parameters, output port parameters, and network transmission/reception setting parameters.

Among the parameters, input channel parameters ICD(ic) are plural parameters to control signal processing performed in the respective channels (first input channel ic1 to w-th input channel icw) in the plural input channels 126. Note that ic is input channel identification information. Further, output channel parameters OCD (oc) are plural parameters to control signal processing performed in the respective channels in the plural output channels 128. Note that oc is output channel identification information.

The patch parameters are parameters to define connection between a signal supply source and a signal supply destination used by the patch 122. More specifically, the patch parameters are SID(sp) indicating a supply source connected with the respective ports (first transmission port sp1 to x-th transmission port spx) of the plural transmission ports 123, SID(op) indicating a supply source connected with the respective ports (first output port op1 to m-th output port opm) of the plural output ports 125, and SID(ic) indicating a supply source connected with the respective channels of the plural input channels 126. Note that sp and op are identification information of a transmission port and an output port, respectively.

The input port parameters are parameters to control signal processing performed by the plural input ports 121. Further, regarding the respective ports (first input port ip1 to n-th input port ipn) of the plural input ports 121, an input port parameter IPD(ip) including a gain value of a head amplifier, phantom power-source ON/OFF, HPF ON/OFF and the like, is stored. Note that ip is identification information of an input port.

The output port parameters are parameters to control signal processing performed by the plural output ports 125. Further, regarding the respective ports of the plural output ports 125, an output port parameter OPD(op) including a delay amount in delaying, a gain value in gain control, and the like, is stored.

Network reception setting parameters are plural parameters to define data reception via the audio network 30. The network reception setting parameters include an extraction band tID(rp) indicating a transmission band from which the respective ports (first reception port rp1 to y-th reception port rpy) of the plural reception ports 124 extract the audio signal. In this example, rp is identification information of a reception port. Note that a transmission band tID(sp) indicating a transmission band into which the respective ports of the plural transmission ports 123 transmit the audio signal is stored in another memory different from the operation parameter memory. The transmission band tID(sp) is not included in a scene stored in the scene memory.

The digital mixer 10 is capable of editing the above-described respective parameter values shown in FIG. 4 in accordance with user's operation with respect to a user interface of the digital mixer 10 itself.

Next, scene recall and recall safe in the digital mixer 10 will be described.

In the digital mixer 10, assuming that one set of parameter values shown in FIG. 4 correspond to one scene, plural scenes can be stored in the scene memory as a second storage portion provided in the flash memory 102. Then in accordance with a user's recall instruction, the parameter values included in one scene among the plural scenes, designated in the recall instruction, are recalled (called).

The recall is performed by writing the parameter values of the scene over the corresponding parameter values in the operation parameter memory. The processing related to the recall will be described in detail later.

Further, it is possible to store (save) a set of parameter values stored in the operation parameter memory at some point, in accordance with the user's store instruction, as one scene designated in the store instruction, into the scene memory.

The characteristic feature of this embodiment is that upon scene recall as described above, regarding setting of the input/output ports connected with the transmission/reception ports and patch setting for the input/output ports connected with the transmission/reception ports, it is possible to designate entire exception (recall safe) from the recall subject.

Figure 5:
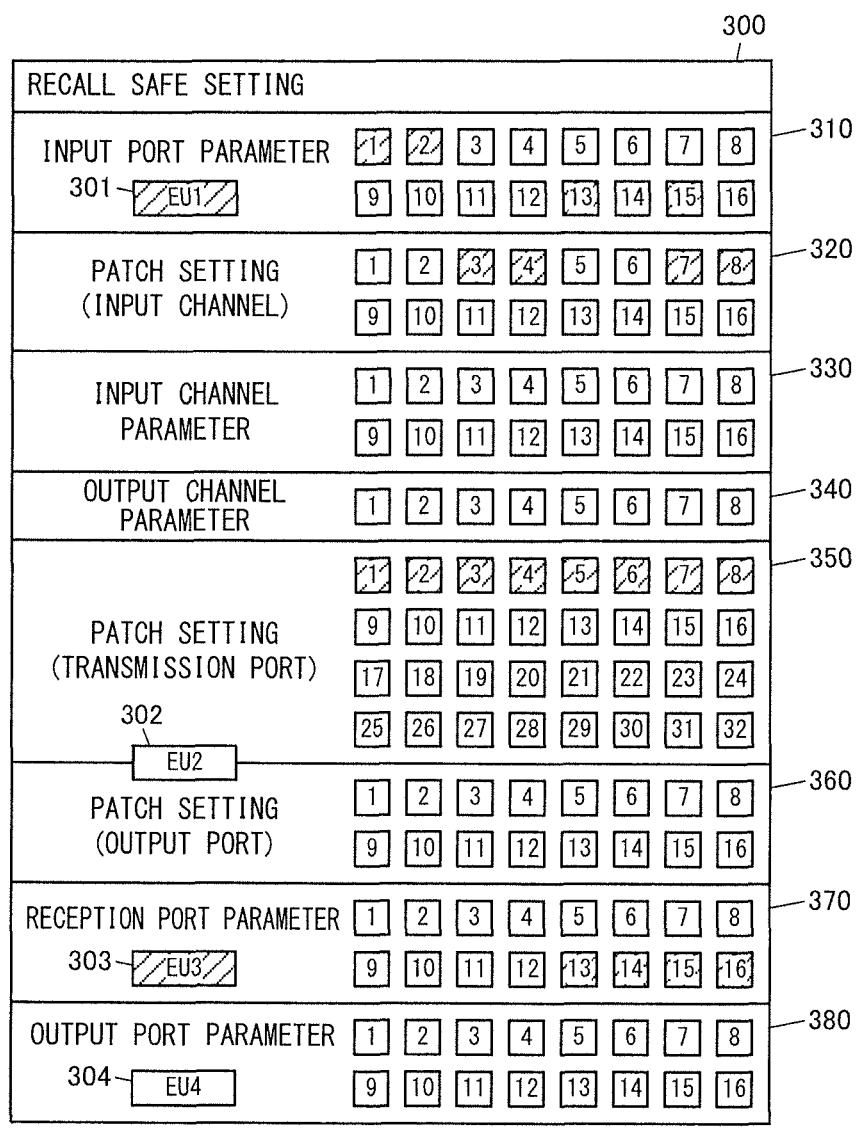
FIG. 5 is a diagram illustrating an example of a recall safe setting screen.

FIG. 5 illustrates an example of a recall safe setting screen to accept the recall safe setting.

The recall safe setting screen 300 is a GUI (graphical user interface) displayed on the indicator 105 of the digital mixer 10. The recall safe setting screen 300 has individual safe setting sections 310 to 380 to individually accept recall safe setting for each of parameter group such as respective channel parameters and respective port parameters, and particular group safe setting buttons 301 to 304 to accept the above-described entire recall safe setting for each of particular groups respectively including plural parameter groups.

In the screen, an individual safe setting section 310 is a section to set validity or invalidity of recall safe in units of ports regarding parameters (input port parameters in FIG. 4) used in signal processing in the input port 121. In this example, buttons with numerals 1 to 16 corresponding to sixteen input ports are provided. These buttons are turned ON/OFF by toggle operation. In FIG. 5, a hatched button is in ON state indicating that upon recall, a group of parameter values of a corresponding input port are not overwritten (recall safe is valid). An unhatched button is in OFF state indicating that a group of parameter values of the corresponding input port are overwritten (recall safe is invalid). Regarding these buttons, including buttons provided in other individual safe setting sections, except the difference in correspondence with port or channel, they have the same function.

The individual safe setting section 320 is a section to set validity or invalidity of recall safe in units of channels regarding patch setting related to the plural input channels 126 (supply sources SID(ic) to the respective input channels in FIG. 4).

The individual safe setting section 330 is a section to set validity or invalidity of recall safe in units channels regarding parameters used for signal processing in the plural input channels 126 (input channel parameters ICD(ic) in FIG. 4).

The individual safe setting section 340 is a section to set validity or invalidity of recall safe in units of channels regarding parameters used for signal processing in the plural output channels 128 (output channel parameters OCD(oc) in FIG. 4).

The individual safe setting section 350 is a section to set validity or invalidity of recall safe in units of ports regarding patch setting related to the plural transmission ports 123 (supply sources SID(sp) to the respective transmission ports in FIG. 4).

The individual safe setting section 360 is a section to set validity or invalidity of recall safe in units of ports regarding patch setting related to the plural output ports 125 (supply sources SID(op) to the respective output ports in FIG. 4).

The individual safe setting section 370 is a section to set validity or invalidity of recall safe in units of ports regarding parameters used for determination of extraction band in the plural reception ports 124 (extraction band tID(rp) of the respective reception ports in FIG. 4).

The individual safe setting section 380 is a section to set validity or invalidity of recall safe in units of ports regarding parameters used for signal processing in the plural output ports 125 (output port parameters in FIG. 4).

On the other hand, the particular group safe setting button 301 is a button to collectively set validity or invalidity of recall safe of all the ports satisfying a condition that they are connected to none of the plural input channels 126 but connected to any of the plural transmission ports 123, among the plural input ports 121, assuming the input port parameters IPD(ip) in FIG. 4 as one first particular group. When the user turns ON the particular group safe setting button 301, all the parameters IPD(ip) of the input ports satisfying this condition are subjected to the recall safe setting. Upon this operation, it is not necessary for the user to grasp the connection destinations of the individual input ports in the patch.

Note that the determination of a connection destination of a port is performed based on, not a patch parameter in the operation parameter memory upon recall instruction (i.e., before execution of recall), but a patch parameter in the operation parameter memory after the execution of recall (in principle, a patch parameter in a scene to be recalled, but regarding a point of the patch parameter to be subjected to the recall safe setting, the patch parameter in the operation parameter memory before the execution of recall, and the determination is made in the same manner hereinafter.).

By turning the particular group safe setting button 301 ON, it is possible to maintain pre-recall setting of an input port related to an input signal which is, after scene recall, directly transmitted to another device via the audio network 30 and which is not supplied to inner signal processing except signal processing by the input port itself. Accordingly, it is possible to reduce the influence of recall on the signal processing in the other audio signal processing device which has received the audio signal from the input port.

Further, the particular group safe setting button 302 is a button to collectively set validity or invalidity of recall safe of all the transmission ports satisfying a condition that they are connected to any of the plural input ports 121 before execution of recall and output ports satisfying a condition that they are connected to any of the plural reception ports 124 before execution of recall, among the plural transmission ports 123 and the plural output ports 125, assuming the supply sources SID(sp) to the transmission port and the supply sources SID(op) to the output port in FIG. 4 as one second particular group. When the user turns the particular group safe setting button 302 ON, all the patch settings (SID(sp)) of the transmission ports and patch settings (SID(op)) of the output ports respectively satisfying the above condition are subjected to the recall safe setting. Upon this operation, it is not necessary for the user to grasp the connection destinations of the transmission ports and the output ports in the patch. Note that the determination of a connection destination of a port is performed based on, different from the case of the particular group safe setting button 301, a patch settings in the operation parameter memory before execution of recall.

By turning the particular group safe setting button 302 ON, it is possible to maintain pre-scene-recall connection between an input port and a transmission port and pre-scene-recall connection between a reception port and an output port, related to an audio signal not supplied to inner signal processing except signal processing performed in input/output ports, as they are after the scene recall. Accordingly, it is possible to reduce the influence of recall with respect to another audio signal processing device which receives the audio signal from the input port, and another audio signal processing device which has transmitted the audio signal being received by the reception port. Note that it may be arranged to provide a particular group safe setting button to set the recall safe with respect to only the supply sources SID(sp) to the transmission ports assuming them as one particular group, and/or a particular group safe setting button to set the recall safe with respect to only the supply sources SID(op) to the output ports assuming them as one particular group, not handing the supply sources SID(sp) to the transmission ports and the supply sources SID(op) to the output ports as one particular group.

Further, the particular group safe setting button 303 is a button to collectively set validity or invalidity of recall safe of all the ports satisfying a condition that they are connected to none of the plural input channels 126 but connected to any of the plural output ports 125, among the plural reception ports 124, assuming the extraction bands tID(sp) of the reception ports in FIG. 4 as one third particular group. When the user turns the particular group safe setting button 303 ON, all the extraction bands tID(sp) of the reception ports satisfying this condition are subjected to the recall safe setting. Upon this operation, it is not necessary for the user to grasp the individual port numbers in the patch. Note that the determination of a connection destination of a port is performed based on patch parameter in the operation parameter memory after execution of recall.

By turning the particular group safe setting button 303 ON, it is possible to maintain pre-recall setting of extraction from the network 30 with respect to an audio signal which is, after scene recall, received from another device via the network 30 and directly outputted from the output terminal and which is not supplied to inner signal processing except signal processing performed in the output port. Accordingly, it is possible to reduce the influence of recall with respect to signal processing in the other digital mixer 10B which outputs the audio signal utilizing the output terminal of the digital mixer 10A.

Further, the particular group safe setting button 304 is a button to collectively set validity or invalidity of recall safe of all the ports satisfying a condition that they are connected to any of the plural reception ports 124, among the plural output ports 125, assuming the output port parameters OPD(op) in FIG. 4 as one fourth particular group. When the user turns the particular group safe setting button 304 ON, all the parameters OPD(op) of the output ports satisfying this condition are subjected to the recall safe setting. Upon this operation, it is not necessary for the user to grasp the connection destinations of the individual output ports in the patch. Note that the determination of a connection destination of a port is performed based on patch parameter in the operation parameter memory after execution of recall. The operation is performed on the condition regardless of whether or not the supply source (reception port) connected to the supply destination is also connected to another supply source (input channel), since the parameter of the output port does not influence the audio signal at the reception port as a connection destination at all.

By turning the particular group safe setting button 304 ON, it is possible to maintain pre-recall setting of the output ports related to an output signal which is, after the scene recall, received from another device via the network 30 and directly outputted from the output terminal, and not supplied to inner signal processing except signal processing performed in the output port. Accordingly, it is possible to reduce the influence of recall with respect to the signal processing in the other digital mixer 10B which outputs the audio signal utilizing the output terminal of the digital mixer 10A.

All the above-described recall safe settings with the particular group safe setting buttons 301 to 304 and the individual safe setting sections 310 to 380 may be independently turned ON and OFF.

It is possible to selectively and easily set the recall safe related to setting of the respective elements related to an audio signal not supplied to signal processing inside the digital mixer 10 except signal processing in the input ports and output ports, using the particular group safe setting buttons 301 to 304, even when the user does not grasp the relevant particular port numbers.

Next, processing related to execution of recall in accordance with the above-described recall safe setting will be described.

Figure 6:
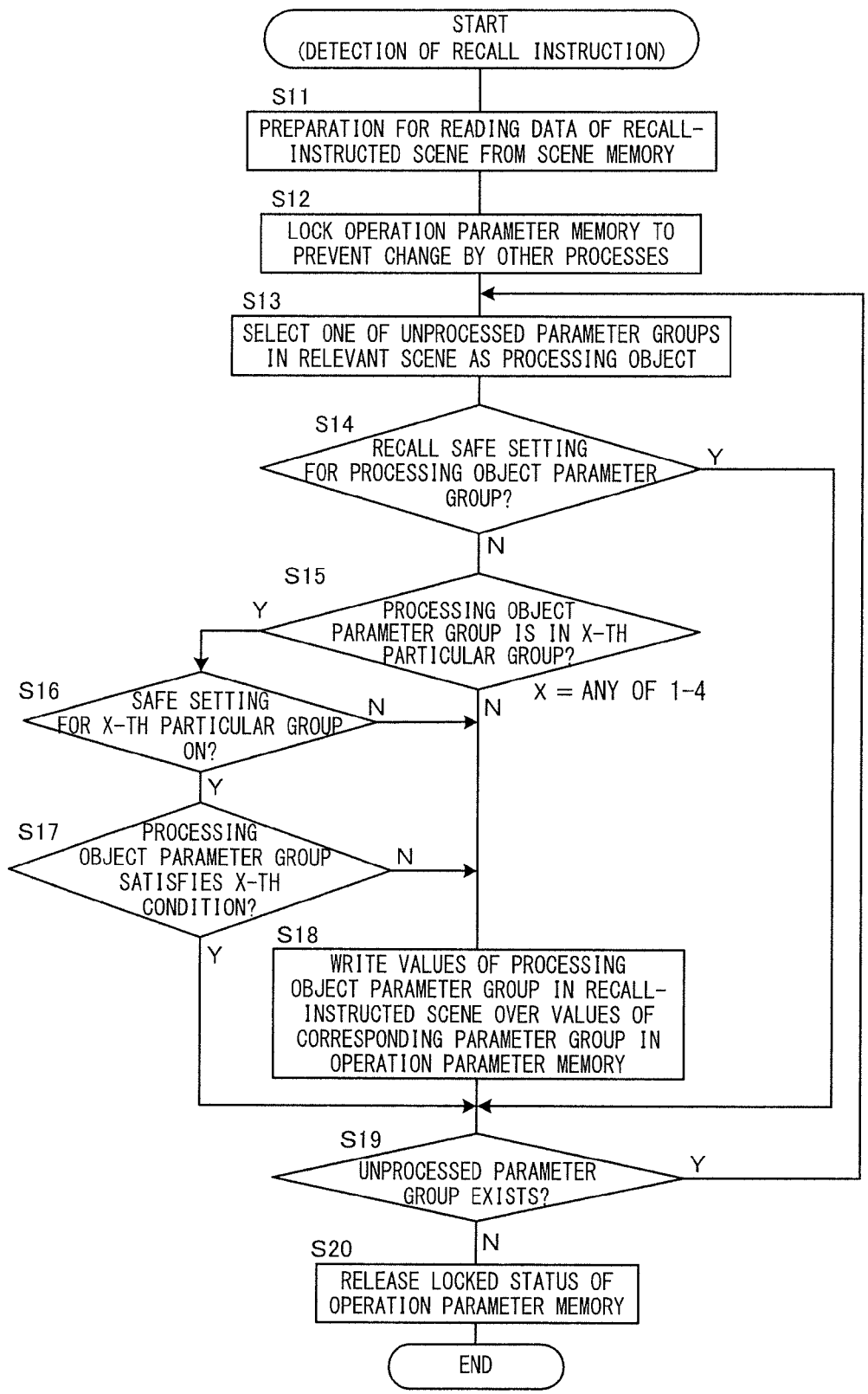
FIG. 6 is a flowchart of processing performed by a CPU of the digital mixer shown in FIG. 1 when the CPU detects a recall instruction.

FIG. 6 is a flowchart of processing which the CPU 101 of the digital mixer 10 executes when the CPU 101 detects a recall instruction. This processing relates to an embodiment of the parameter recall method according to the present invention.

When the CPU 101 detects that the user has selected a scene to be recalled from plural scenes in the scene memory and instructed execution of recall by operating the manipulandum 106 or the like, the CPU 101 starts the processing shown in the flowchart of FIG. 6.

First, the CPU 101 specifies data of the scene regarding which recall has been instructed (relevant scene), and make preparations for reading the data from the scene memory (S11). Next, the CPU 101 locks the operation parameters in the operation parameter memory so as not to be referred to by other processes (S12). The locked operation parameter values are not changed by other processes, and further, they do not influence signal processing with the digital mixer 10.

Next, the CPU 101 selects one of unprocessed parameter groups in the relevant scene as a processing object (S13). The parameter group is a recall safe setting unit in the individual recall setting.

Next, the CPU 101 determines whether or not the recall safe setting is made for the processing object parameter group (S14). The setting used in this determination is the setting made in the individual safe setting sections 310 to 380. For example, when the processing object parameter group is a group of parameters related to the first input channel, it is determined whether or not recall safe is set regarding parameters of the first input channel.

When No at step S14, next, the CPU 101 determines whether or not the processing object parameter group is included in any particular group (S15). As described above, the particular groups respectively correspond to one of the particular group safe setting buttons 301 to 304. The particular group safe setting button 301 corresponds to the first particular group; the particular group safe setting button 302, the second particular group; the particular group safe setting button 303, the third particular group; the particular group safe setting button 304, the fourth particular group. Note that at step S15, the determination is made regardless of the channel or port which the processing object parameter group belongs to. Further, when the processing object parameter group belongs to any of the particular groups, the determination at step S15 is YES, and the CPU 101 substitutes identification information of the relevant particular group into X (one of 1 to 4 in this example).

When YES at step S15, next, the CPU 101 determines whether or not the recall safe for the X-th particular group is valid (whether or not the corresponding particular group safe setting button is ON) (S16). When Yes at this step, the CPU 101 determines whether or not the channel or port related to the processing object parameter group is a channel or port which satisfies the X-th condition of the X-th particular group, i.e., the processing object parameter group is an object of the recall safe on the X-th condition of the X-th particular group (S17).

Note that the X-th condition of the respective particular groups is as follows.

(1) First Condition Regarding the First Particular Group

In patch setting after the scene recall, an input port corresponding to the processing object parameter group is not connected to any of the plural input channels 126, but connected to one of the plural transmission ports 123.

(2) Second Condition Regarding the Second Particular Group

In patch setting before the scene recall, a transmission port corresponding to the processing object parameter group is connected to any of the plural input ports 121, or an output port corresponding to the processing object parameter group is connected to any of the plural reception ports 124.

(3) Third Condition Regarding the Third Particular Group

In patch setting after the scene recall, a reception port corresponding to the processing object parameter group is not connected to any of the plural input channels 126, but connected to any of the plural output ports 125.

(4) Fourth Condition Regarding the Fourth Particular Group

In patch setting after the scene recall, an output port corresponding to the processing object parameter group is connected to any of the plural transmission ports 123.

When YES at step S17, the CPU 101 determines that the processing object parameter group is the object of the recall safe. Accordingly, the process proceeds to step S19 without writing the group of parameter values over the corresponding parameter group in the operation parameter memory. When an unprocessed parameter group exists in the relevant scene (YES at S19), the CPU 101 returns to step S13 to select the next parameter group as a processing object, and repeats the processing.

When YES at step S14, as it is determined that the processing object parameter group is an object of the recall safe, similarly, the overwriting is not performed on the corresponding parameter group.

When NO at step S15, S16 or S17, it is determined that the processing object parameter group is not an object of the recall safe. Then the CPU 101 writes the values of the processing object parameter group in the relevant scene over the values of the corresponding parameter group in the operation parameter memory (S18), then proceeds to step S19.

When No at step S19, i.e., when all the parameter groups in the relevant scene have been processed, the CPU 101 releases the locked status of the operation parameters (S20), then terminates the processing in FIG. 6. Thus operation parameters in the operation parameter memory come to be able to be referred by other processes, and thus the operation parameter values after the scene recall are reflected in the various signal processings in the digital mixer 10.

In the above-described processing, the processings at steps S13 to S19 correspond to a recall procedure. In these processings, the CPU 101 functions as a recall portion. Further, the processings at steps S15 to S17 correspond to a prohibition procedure. In these processings, the CPU 101 functions as a prohibition portion.

With the processing in FIG. 6, it is possible to perform recall in accordance with various recall safe settings described using FIG. 5. Accordingly, regarding the parameters of portions to connect the input ports 121 to the transmission ports 123 and the output ports 125 to the reception ports 124 in the digital mixer 10A and handle an audio signal mainly processed by the other digital mixer 10B, the user can set the recall safe with a simple operation even when the user does not grasp particular port numbers, thus it is possible to avoid influence of scene recall. Accordingly, it is possible to suppress the influence on signal processing in the other audio signal processing device.

The embodiment is as described above, however, the device configuration, the particular processing, the processing procedures, the data structure, the screen display content, the operation method and the like are not limited to those described in the above embodiment.

For example, the unit of recall safe setting is not limited to that described using FIG. 5. For example, a manipulandum to switch ON and OFF of plural particular groups at once may be provided. Further, it is not necessary to provide the individual safe setting sections 310 to 380.

Further, the above-described first condition may be "in patch setting in the recall-instructed scene, an input port corresponding to the processing object parameter group is not connected to any of the input channels 126". That is, an input port not connected to an input channel after the recall is excluded from the recall object since a signal from the input port is not processed in the digital mixer 10A after the recall. In this modification, as parameter values of a port with a possibility of connection with the transmission port 123 are maintained. Using this condition, it is possible to obtain similar advantage to that in the case of the above-described embodiment.

Further, it is not necessary that a scene includes all the operation parameters shown in FIG. 4. It is conceivable that an arbitrary part of the operation parameters, such as only the input port parameters, the transmission parameters and the patch parameters are stored as a scene and recalled. In this case, with the processing shown in FIG. 6, the recall safe setting can be reflected in the recall. Note that parameter values not included in the scene to be recalled are not changed before and after the recall. Accordingly, the recall safe setting related to the parameters not included in the scene to be recalled does not influence the recall operation.

Further, in the above-described embodiment, the digital mixer 10 has all the plural input ports 121, the plural transmission ports 123, the plural reception ports 124, the plural output ports 125, and the signal processing channels (the plural input channels 126 and the plural output channels 128), however, it is not necessary that the digital mixer 10 has all these elements. The present invention is applicable to a device having only a part of these elements, e.g. only the plural input ports 121, the plural transmission ports 123 and the signal processing channels, or only the plural reception ports 124, the plural output ports 125 and the signal processing channels.

Further, the signal processing performed in the signal processing channel does not necessarily include a signal process such as dynamics process or equalizing. The signal processing may be simple recording and playback. A signal processing section, which is a so-called "track", is also an example of the signal processing channel.

Further, the present invention is applicable to other audio signal processing devices than the digital mixer. Even when the invention is applied to a synthesizer, a recorder, an effector, a tone generator or the like, in the case where the invention is applied to parameter value recall in an audio signal processing device having plural input ports, plural output ports, plural transmission ports, plural reception ports, and a patch to transmit an audio signal between these ports in accordance with previously-set correspondence, it is possible to obtain similar advantages to those in the above-described embodiment.

Further, the embodiment of the program according to the present invention is a program to enable a computer to control to control an audio signal processing device without the function of the recall safe setting using the particular group safe setting buttons 301 to 304, and thereby realizing the function of the recall safe setting using the particular group safe setting buttons 301 to 304.

This program may be previously stored in a ROM in the computer or another nonvolatile storage medium (flash memory, an EEPROM or the like). However, the program may be provided as an arbitrary nonvolatile recording medium such as a memory card, a CD, a DVD, or a blue ray disc storing the program. It is possible to make a computer perform the above-described respective procedures by installing the program recorded in the recording medium into the computer making the computer execute the program.

Further, it is possible to download the program from a recording medium, in which the program is stored, of an external device connected to a network, or an external device in which the program is stored in its storage, connected to a network, and install the downloaded program into the computer and make the computer execute the program.

Further, it is possible to arbitrarily combine and adopt the above-described configuration and modification within a consistent range.

INDUSTRIAL APPLICABILITY

As it is apparent from the above description, according to the audio signal processing device, the parameter recall method and the program according to the present invention, even when a previously stored value is recalled as a parameter value to be used in the audio signal processing device, regarding a portion connecting input or output from a terminal and transmission or reception with respect to a network, it is possible to maintain a parameter value before recall with a simple operation.

Accordingly, by application of the present invention, it is possible to improve operability of operation related to parameter recall when plural audio signal processing devices are connected and operated via a network.

REFERENCE SIGNS LIST

10 . . . digital mixer, 30 . . . audio network, 101 . . . CPU, 102 . . . flash memory, 103 . . . RAM, 104 . . . external equipment I/O, 105 . . . indicator, 106 . . . manipulandum, 108 . . . waveform I/O, 109 . . . audio network I/O, 110 . . . DSP, 111 . . . system bus, 112 . . . audio bus, 121 . . . input port, 122 . . . patch, 123 . . . transmission port, 124 . . . reception port, 125 . . . output port, 126 . . . input channel, 127 . . . bus, 128 . . . output channel, 300 . . . recall safe setting screen, 301 to 304 . . . particular group safe setting button, and 310 to 380 . . . individual safe setting section.

The invention claimed is:

1. An audio signal processing device comprising:
a plurality of transmission ports each configured to transmit a respective audio signal via a network;
a plurality of input ports each configured to receive a respective audio signal from outside without using the network and process the received audio signal based on a corresponding port parameter value;
a plurality of signal processing channels each configured to process a respective audio signal;
a patch configured to supply audio signals from the plurality of input ports to the plurality of transmission ports and the plurality of signal processing channels in accordance with a plurality of connections indicated by patch parameter values;
a first storage configured to store at least the port parameter values of the respective input ports and the patch parameter values of the patch;
a second storage configured to store a set of parameter values including parameter values corresponding to at least a part of the port parameter values and at least a part of the patch parameter values in the first storage;
a recall portion configured to write parameter values included in one set of the parameter values stored in the second storage over corresponding parameter values in the first storage in accordance with a recall instruction; and
a prohibition portion configured to:
before the overwriting by the recall portion, determine for each of the input ports whether or not connections indicated by patch parameter values in the first storage after the overwriting by the recall portion will satisfy a predetermined condition, and
prohibit the overwriting of the port parameter value of the input port by the recall portion if the determination for the input port is affirmative.

2. The audio signal processing device according to claim 1,
wherein the predetermined condition is that the input port is not connected to any of the signal processing channels but is connected to any of the transmission ports.

3. The audio signal processing device according to claim 1,
wherein the predetermined condition is that the first input port is not connected to any of the signal processing channels.

4. An audio signal processing device comprising:
a plurality of network transmission/reception ports each configured to transmit a respective audio signal to another equipment via a network or receive a respective audio signal from another equipment via the network;
a plurality of input/output ports each configured to receive a respective audio signal from outside without using the network or output a respective audio signal to outside without using the network;
a plurality of signal processing channels each configured to process a respective audio signal;
a patch configured to transmit audio signals among the plurality of input/output ports, the plurality of network transmission/reception ports, and the plurality of signal processing channels, in accordance with a plurality of connections indicated by values of one set of parameters;
a first storage configured to store the values of the one set of parameters;
a second storage configured to store a set of values including values corresponding to at least a part of the values of the one set of parameters in the first storage;
a recall portion configured to write one set of values stored in the second storage over corresponding values of parameters in the first storage in accordance with a recall instruction; and
a prohibition portion configured to:
determine for each parameter value of the one set of parameters whether or not a parameter value before the overwriting by the recall portion indicates a connection between any of the input/output ports and any of the network transmission/reception ports, and
prohibit the overwriting of the parameter value by the recall portion if the determination for the parameter value is affirmative.

5. An audio signal processing device comprising:
a plurality of reception ports each configured to receive a respective audio signal via a network based on a port parameter value;
a plurality of output ports each configured to output a respective audio signal to outside without using the network;
a plurality of signal processing channels each configured to process a respective audio signal;
a patch configured to supply audio signals from the plurality of reception ports to the plurality of output ports and the plurality of signal processing channels, in accordance with a plurality of connections indicated by patch parameter values;
a first storage configured to store at least the port parameter values of the respective reception ports and the patch parameter values of the patch;
a second storage configured to store a set of parameter values including parameter values corresponding to at least a part of the port parameter values and at least a part of the patch parameter values in the first storage;
a recall portion configured to write parameter values included in one set of the parameter values stored in the second storage over corresponding parameter values in the first storage in accordance with a recall instruction; and
a prohibition portion configured to:
before the overwriting by the recall portion, determine for each of the reception ports whether or not patch parameter values in the first storage after the overwriting by the recall portion will indicate that the reception port is not connected to any of the signal processing channels but is connected to any of the output ports, and
prohibit the overwriting of the port parameter value of the reception port by the recall portion if the determination for the reception port is affirmative.

6. An audio signal processing device comprising:
a plurality of reception ports each configured to receive a respective audio signal via a network;
a plurality of output ports each configured to process a respective audio signal and output the processed audio signal to outside without using the network based on a corresponding port parameter value;
a plurality of signal processing channels each configured to process a respective audio signal;
a patch configured to supply audio signals from the plurality of reception ports to the plurality of output ports and the plurality of signal processing channels, in accordance with a plurality of connections indicated by patch parameter values;
a first storage configured to store at least the port parameter values of the plurality of output ports and the patch parameter values of the patch;
a second storage configured to store a set of parameter values including parameter values corresponding to at least a part of the port parameter values and at least a part of the patch parameter values in the first storage;
a recall portion configured to write parameter values included in one set of parameter values stored in the second storage over corresponding parameter values in the first storage in accordance with a recall instruction; and
a prohibition portion configured to:
before the overwriting by the recall portion, determine for each of the output ports whether or not a patch parameter value of the output port in the first storage after the overwriting by the recall portion will indicate a connection between the output port and any of the reception ports, and
prohibit the overwriting of the port parameter value of the output port by the recall portion if the determination for the output port is affirmative.

7. A parameter recall method in an audio signal processing device comprising: a plurality of transmission ports each configured to transmit a respective audio signal via a network; a plurality of input ports each configured to receive a respective audio signal from outside without using the network and process the received audio signal based on a corresponding port parameter value; a plurality of signal processing channels each configured to process a respective audio signal; a patch configured to supply audio signals from the plurality of input ports to the plurality of transmission ports and the plurality of signal processing channels in accordance with a plurality of connections indicated by patch parameter values; a first storage configured to store at least the port parameter values of the respective input ports and the patch parameter values of the patch; and a second storage configured to store a set of parameter values including parameter values corresponding to at least a part of the port parameter values and at least a part of the patch parameter values in the first storage,
the parameter recall method comprising:
recalling parameters by writing parameter values included in one set of the parameter values stored in the second storage over corresponding parameter values in the first storage in accordance with a recall instruction; and
before the overwriting in the recalling, prohibiting, based on determination for each of the input ports whether or not connections indicated by patch parameter values in the first storage after the overwriting in the recalling will satisfy a predetermined condition, the overwriting of the port parameter value of the input port in the recalling if the determination for the input port is affirmative.

8. A parameter recall method in an audio signal processing device comprising: a plurality of network transmission/reception ports each configured to transmit a respective audio signal to another equipment via a network or receive a respective audio signal from another equipment via the network; a plurality of input/output ports each configured to receive a respective audio signal from outside without using the network or output a respective audio signal to outside without using the network; a plurality of signal processing channels each configured to process a respective audio signal; a patch configured to transmit audio signals among the plurality of input/output ports, the plurality of network transmission/reception ports, and the plurality of signal processing channels, in accordance with a plurality of connections indicated by values of one set of parameters; a first storage configured to store the values of the one set of parameters; and a second storage configured to store a set of values including values corresponding to at least a part of the values of the one set of parameters in the first storage,
the parameter recall method comprising:
recalling parameters by writing one set of values stored in the second storage over corresponding values of parameters in the first storage in accordance with a recall instruction; and
prohibiting, based on determination for each parameter value of the one set of parameters whether or not a parameter value before the overwriting in the recalling indicates a connection between any of the input/output ports and any of the network transmission/reception ports, the overwriting of the parameter value in the recalling if the determination for the parameter value is affirmative.

9. A parameter recall method in an audio signal processing device comprising: a plurality of reception ports each configured to receive a respective audio signal via a network based on a port parameter value; a plurality of output ports each configured to output a respective audio signal to outside without using the network; a plurality of signal processing channels each configured to process a respective audio signal; a patch configured to supply audio signals from the plurality of reception ports to the plurality of output ports and the plurality of signal processing channels, in accordance with a plurality of connections indicated by patch parameter values; a first storage configured to store at least the port parameter values of the respective reception ports and the patch parameter values of the patch; and a second storage configured to store a set of parameter values including parameter values corresponding to at least a part of the port parameter values and at least a part of the patch parameter values in the first storage, the parameter recall method comprising:

recalling parameters by writing parameter values included in one set of the parameter values stored in the second storage over corresponding parameter values in the first storage in accordance with a recall instruction; and before the overwriting in the recalling, prohibiting, based on determination for each of the reception ports whether or not patch parameter values in the first storage after the overwriting in the recalling will indicate that the reception port is not connected to any of the signal processing channels but is connected a connection to any of the output ports, the overwriting of the port parameter value of the reception port in the recalling if the determination for the reception port is affirmative.

10. A parameter recall method in an audio signal processing device comprising: a plurality of reception ports each configured to receive a respective audio signal via a network; a plurality of output ports each configured to process a respective audio signal and output the processed audio signal to outside without using the network based on a corresponding port parameter value; a plurality of signal processing channels each configured to process a respective audio signal; a patch configured to supply audio signals from the plurality of reception ports to the plurality of output ports and the plurality of signal processing channels, in accordance with a plurality of connections indicated by patch parameter values; a first storage configured to store at least the port parameter values of the plurality of output ports and the patch parameter values of the patch; and a second storage configured to store a set of parameter values including parameter values corresponding to at least a part of the port parameter values and at least a part of the patch parameter values in the first storage, the parameter recall method comprising:

recalling parameter values by writing parameter values included in one set of parameter values stored in the second storage over corresponding parameter values in the first storage in accordance with a recall instruction; and before the overwriting in the recalling, prohibiting, based on determination for each of the output ports whether or not a patch parameter value of the output port in the first storage after the overwriting in the recalling indicates will indicate a connection between the output port and any of the reception ports, the overwriting of the port parameter value of the output port in the recalling if the determination for the output port is affirmative.

11. A non-transitory machine-readable storage medium containing program instructions executable by a computer to enable the computer to control an audio signal processing device and function as the recall portion and the prohibition portion of the audio signal processing device according to claim 1.

12. A non-transitory machine-readable storage medium containing program instructions executable by a computer to enable the computer to control an audio signal processing device and function as the recall portion and the prohibition portion of the audio signal processing device according to claim 4.

13. A non-transitory machine-readable storage medium containing program instructions executable by a computer to enable the computer to control an audio signal processing device and function as the recall portion and the prohibition portion of the audio signal processing device according to claim 5.

14. A non-transitory machine-readable storage medium containing program instructions executable by a computer to enable the computer to control an audio signal processing device and function as the recall portion and the prohibition portion of the audio signal processing device according to claim 6.

* * * * *